United States Patent
Kutch et al.

(10) Patent No.: US 9,898,435 B2
(45) Date of Patent: Feb. 20, 2018

(54) AGGREGATE BASEBOARD MANAGEMENT CONTROLLER (BMC) CONTROLLER

(71) Applicant: Intel Corporation, Santa Clara, CA (US)

(72) Inventors: Patrick G. Kutch, Beaverton, OR (US); Daniel P. Daly, Ann Arbor, MI (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 14/566,468

(22) Filed: Dec. 10, 2014

(65) Prior Publication Data

US 2016/0170923 A1    Jun. 16, 2016

(51) Int. Cl.
G06F 13/20    (2006.01)
G06F 13/40    (2006.01)
G06F 13/42    (2006.01)

(52) U.S. Cl.
CPC ...... *G06F 13/4022* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 2007/0233455 A1* | 10/2007 | Zimmer | .................. | G06F 9/546 703/27 |
| 2007/0255857 A1* | 11/2007 | Loffink | .............. | G06F 13/4022 710/1 |
| 2007/0260897 A1* | 11/2007 | Cochran | ................. | G06F 1/263 713/300 |
| 2008/0259555 A1* | 10/2008 | Bechtolsheim | ....... | G06F 13/409 361/679.4 |
| 2011/0029734 A1* | 2/2011 | Pope | ..................... | G06F 13/385 711/118 |
| 2011/0058573 A1* | 3/2011 | Balakavi | ................. | H04L 12/66 370/463 |
| 2012/0047309 A1* | 2/2012 | Natu | ..................... | H04L 63/101 710/314 |
| 2013/0325998 A1* | 12/2013 | Hormuth | ........... | G06F 15/17331 709/212 |
| 2015/0331473 A1* | 11/2015 | Jreji | ....................... | G06F 1/3206 713/320 |

* cited by examiner

*Primary Examiner* — Michael Sun
(74) *Attorney, Agent, or Firm* — Schwabe, Williamson & Wyatt, P.C.

(57) ABSTRACT

Apparatuses, methods and storage media associated with the exchange of messages between a hybrid switch and one or more baseboard management controllers (BMCs) are described herein. Specifically, an aggregate BMC controller (ABC) may be communicatively coupled with both the hybrid switch and the BMCs and configured to facilitate the exchange of messages between the hybrid switch and the one or more BMCs. Other embodiments may be described and/or claimed.

21 Claims, 6 Drawing Sheets

Non-transitory computer-readable storage medium 502

Programming Instructions 504
Configured to cause a device, in response to execution of the programming instructions, to practice (aspects of) embodiments of the process of Figures 3a or 3b.

AGGREGATE BASEBOARD MANAGEMENT CONTROLLER (BMC) CONTROLLER

TECHNICAL FIELD

The present disclosure relates to the field of network connectivity for electronic devices, and specifically to message exchange between hybrid switches and baseboard management controllers (BMCs) in computer server environments.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Typically, network controllers such as Ethernet controllers may be provided in legacy server systems either as a local area network (LAN) on motherboard (LOM), or as a proprietary daughter card. A BMC may be connected to the network controller in a 1 to 1 ratio. The network controller, and the connection between the network controller and the BMC, may be referred to as a sideband interface. Typically, the network controller may also be coupled with a host processor running or associated with the operating system (OS) of the system. In other words, the host processor may share the network controller with the BMC to send and/or receive Ethernet traffic. In operation, the network controller may analyze incoming network traffic and identify whether the network traffic is intended for the host processor or the BMC. The network controller may then route the network traffic appropriately.

However, in some rack scale servers, the network controller may not be a separate physical element of the system, but may instead be an element of a hybrid switch that is used for network connectivity. In these embodiments, the host processor and BMC may be unable to share the network controller because the network controller may not be a separate physical entity that is able to be physically coupled with both the controller and the BMC. As a result, there may be no sideband interface which may result in increased costs due to the use of a dedicated Ethernet port to the hybrid switch to communicate with the BMC.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage media associated with the exchange of messages between a hybrid switch and one or more baseboard management controllers (BMCs) are described herein. Specifically, an aggregate BMC controller (ABC) may be communicatively coupled with both the hybrid switch and the BMCs and configured to facilitate the exchange of messages between the hybrid switch and the one or more BMCs. In embodiments, the ABC may be configured to send and receive networking messages to or from a networking port of the hybrid switch. The ABC may be further configured to send and receive input/output (I/O) bus messages to or from the BMCs. Additionally, the ABC may be configured to convert the networking messages to I/O bus messages or vice versa.

A BMC may be responsible for monitoring various physical processes or elements of a computing system such as power usage, processor temperature, etc. Typically, it may be desirable for BMCs to be able to send and receive network traffic between the BMC and a remote administration-based system, and so the BMCs may be configured to send and receive network traffic such as Ethernet traffic.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
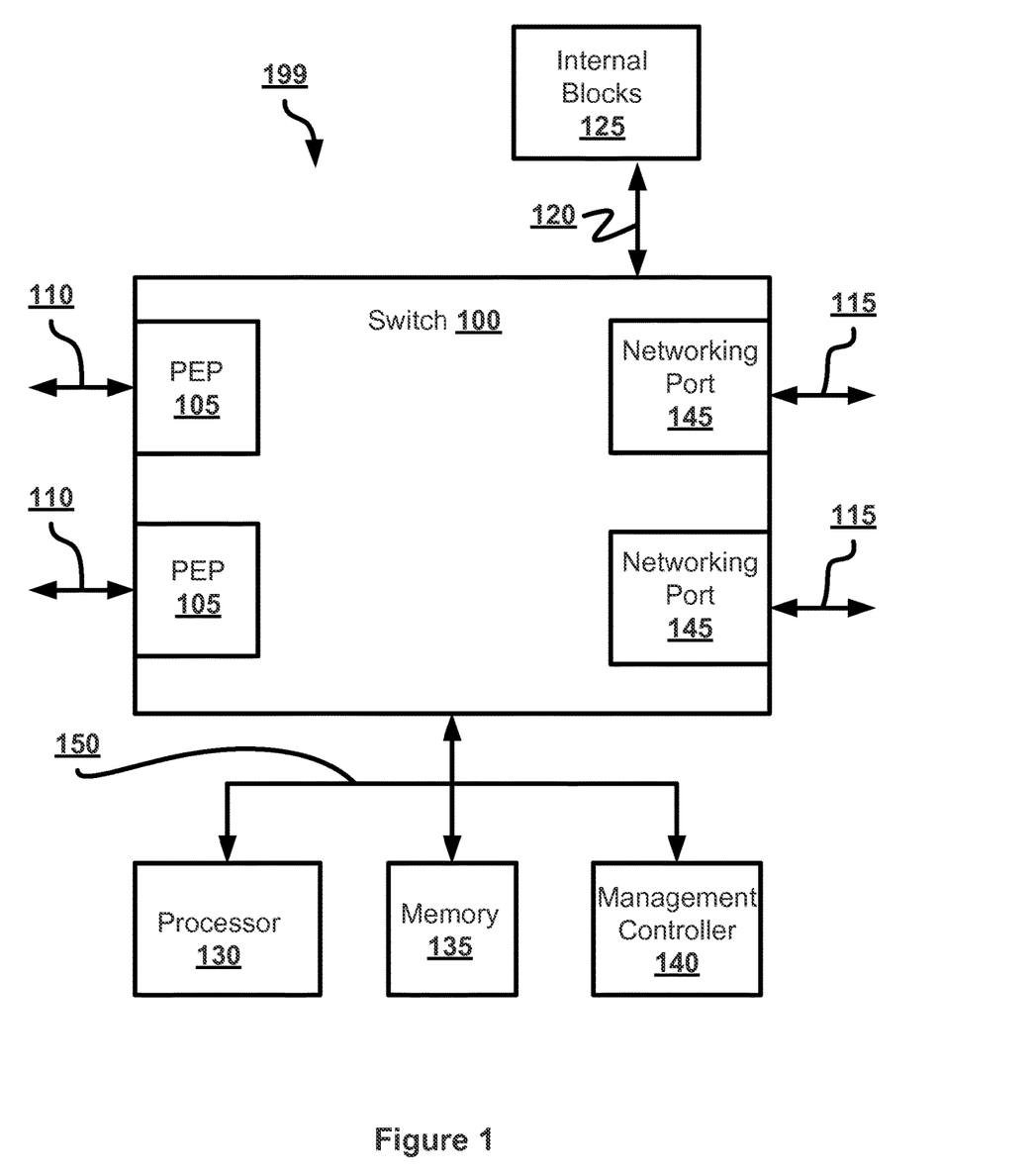
FIG. 1 illustrates a hybrid switch, in accordance with various embodiments.

FIG. 1 depicts a high level example of a hybrid switch product 199. The switch product 199 may include a switch 100 that may include one or more peripheral component interconnect express (PCIe) end points (PEPs) 105. In embodiments, the PEPs 105 may act as network controllers, and specifically as Ethernet controllers. In embodiments, one or more of the PEPs 105 may be coupled with a component that may be a host processor such as a central processing unit (CPU), graphics processor, or some other type of processor or host processor via one or more PCIe buses 110. In embodiments, the PEPs 105 may send/receive network traffic such as Ethernet traffic to or from the host processor via the PCIe buses 110.

In some embodiments, the hybrid switch 100 may additionally include one or more networking ports 145 configured to send or receive networking messages over networking links 115. In embodiments, the networking ports 145 may be Ethernet ports, and the networking links 115 may be Ethernet links configured to send and/or receive Ethernet traffic or messages. In some embodiments, the networking messages may include data that may be Ethernet data such as one or more Ethernet packets. In other embodiments, the networking links 115 may be configured to send and/or receive data in networking traffic or networking messages according to one or more other protocols.

The hybrid switch product 199 may further include one or more internal blocks 125 and/or a bus 120 coupling the one or more internal blocks 125 to the switch 100. The one or more internal blocks 125 may be respective switching application-specific integrated circuits (ASICs). Specifically, the internal blocks 125 may be responsible for Ethernet switching activities.

The hybrid switch product 199 may further include one or more processors 130 and a bus 150. The hybrid switch 100 may be coupled with the one or more processors 130 via the bus 150. In embodiments, the processor 130 may be, for example, a frame processing unit or pipeline. The frame processing pipeline may be configured to process incoming data frames and identify how the frames should be handled, for example, on the basis of a frame header of one or more of the frames. In other embodiments, the processor 130 may be some other type of processor.

The hybrid switch product 199 may further include a memory 135. The hybrid switch 100 may be coupled with the memory 135 via the bus 150. In some embodiments, the memory 135 may be a rapid array shared memory. In other embodiments, the memory 135 may be a random access memory (RAM), a read-only memory (ROM), an erasable programmable read-only memory (EPROM or flash memory), or some other type of memory.

The hybrid switch product 199 may further include a management controller 140 that may be configured, for example, to interface with and provide command signals to the PEPs 105 of the hybrid switch 100. Specifically, the hybrid switch 100 may be coupled with the management controller 140 via the bus 150. In some embodiments, one or more of the processor(s) 130, memory 135, and management controller 140 may be configured to communicate with one another. In some embodiments, one or more of the processor 130, memory 135, and management controller 140 may be elements of the switch 100. Although only a single processor 130, memory 135, and/or management controller 140 are shown in FIG. 1, in some embodiments the hybrid switch product 199 may include two or more processors 130, memories 135, or management controller 140. In some embodiments, the hybrid switch product 199 may not include, or the switch 100 may not be coupled with, one or more of the processor 130, memory 135, and/or management controller 140.

Although only two PEPs 105 and two networking ports 145 are depicted in FIG. 1, in other embodiments the hybrid switch 100 may have more or fewer PEPs 105 and/or networking ports 145. Additionally, the hybrid switch 100 may have more or fewer networking links 115 or PCIe buses 110 than are depicted in FIG. 1.

Figure 2:
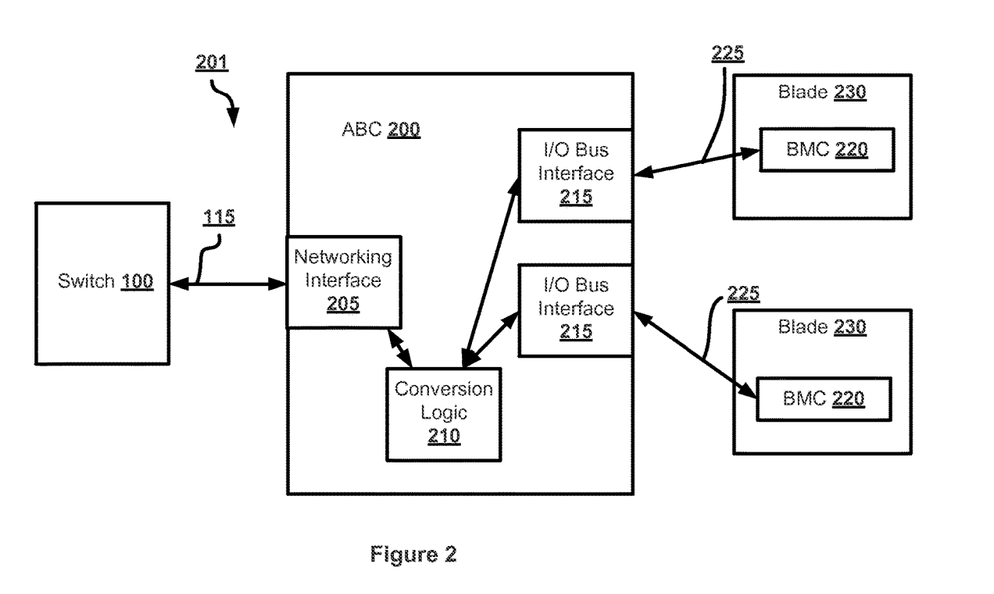
FIG. 2 illustrates a system that includes a hybrid switch, an aggregate BMC controller (ABC), and a plurality of BMCs, in accordance with various embodiments.

FIG. 2 depicts an example system 201 that may be a rack system. In embodiments, the system 201 may be a conventional rack server configuration wherein the system 201 may include several servers that may be referred to as blades or blade servers. In other embodiments, the system 201 may be a rack based on a rack scale architecture that may include pools of disaggregated components such as computing components, storage components, memory components, networking components, etc. Specifically, in these embodiments the components may be combined and/or coupled in respective sleds, trays, or blades. In other embodiments, the system 201 may be a different type of server, electronic device, or network.

Generally, the system 201 may include the hybrid switch 100, as described above, an ABC 200, and one or more blades, trays or sleds 230 (hereinafter collectively referred to as "blades 230"). In embodiments, the system 201 may include a server chassis or a general chassis for holding the blades 230. In embodiments, the blades 230 may comprise a blade server and may include one or more components mounted to or coupled with the blade 230. The components of the blades 230 may include one or more BMCs 220, as well as components such as processor(s), memory, and/or one or more other components that are not shown in FIG. 2. The components of the blades 230 may be mounted to a blade, tray or server chassis. As noted above, in other embodiments the blades 230 may not be distinct blade servers, but instead may be a collection of components or resources in a sled, tray, or blade chassis. In some embodiments the system 201 may include one or more blades 230 that are distinct blade servers, and one or more blades 230 that are not distinct servers but instead are a collection of components or resources in a sled, tray, or blade chassis.

In some embodiments, the system 201 may further include one or more other components of the hybrid switch product 199 as described above such as the internal block(s) 125, the processor 130, the memory 135, and/or the management controller 140, however those elements are not depicted in FIG. 2 for the sake of clarity of the Figure. In some embodiments, the ABC 200 may be referred to as a control plane processor (CPP), or may be an element of a CPP. In other embodiments, the ABC 200 may be separate from, but communicatively coupled with, a CPP.

In embodiments, the hybrid switch 100, and specifically a networking port of the hybrid switch 100 such as networking port 145 (not shown in FIG. 2), may be coupled with the ABC 200 via networking link 115, as described above. Specifically, the networking port of the hybrid switch 100 may be coupled with a networking interface 205 of the ABC 200 via networking link 115. In embodiments, the networking interface may be configured to send or receive networking traffic or networking messages between the ABC 200 and the hybrid switch 100. In some embodiments, the networking traffic or networking messages may be Ethernet traffic or messages, and include data such as Ethernet packets, while in other embodiments the networking traffic or networking messages may be traffic or messages sent or received according to some other networking protocol and include other types of data.

The ABC 200 may further include one or more input/output (I/O) bus interfaces 215 that are communicatively coupled with the one or more servers 230, and specifically the one or more BMCs 220 via respective I/O buses 225. In some embodiments, one or more of the I/O buses 225 may be referred to as a Low Pin Count (LPC) bus and may, for example, include 7 physical pins (the number of pins in a conventional LPC bus). In embodiments, the LPC bus may be configured to operate according to an LPC protocol as specified in, for example, the "Intel® Low Pin Count (LPC) Interface Specification," Revision 1.1 (August, 2002). In some embodiments, one or more of the I/O buses 225 may include fewer than 7 physical pins. In some embodiments, one or more of the I/O buses 225 may be, for example, a system management bus (SMBus) or an inter-integrated circuit (I2C) bus. In embodiments, the I/O bus interfaces 215 may be configured to send or receive messages or traffic to or from the BMCs 220 via the I/O buses 225.

The ABC 200 may further include conversion logic 210. Generally, the ABC 200 may be configured to facilitate the exchange of messages between the hybrid switch 100 and one or more of the BMC(s) 220. In embodiments, the conversion logic 210 may be communicatively coupled with the networking interface 205 and the I/O bus interface(s) 215. In some embodiments the networking link 115 and the I/O buses 225 may use different protocols that may include, for example, different frame structures, data structures, transmission rates, packet formats, etc. Therefore, the conversion logic 210 may be configured to convert messages or traffic received by the networking interface 205 into messages or traffic that may be transmitted over the I/O bus interface(s) 215, or vice versa. In some embodiments, the conversion logic 210 may further be configured to analyze the networking traffic or messages received by the networking interface 205 and identify which BMC of the BMC(s) 220 the networking traffic or message is intended for, as explained in greater detail below. The conversion logic 210 may then convert the networking traffic or message to an I/O bus message and route the I/O bus message to the appropriate I/O bus interface 215 for transmission to the appropriate BMC 220 over the respective I/O bus 225.

In embodiments, the conversion logic 210 may actually be configured as separate physical circuitry for the conversion and the identification/routing of the I/O bus message to the appropriate BMC. Additionally, in some embodiments, the ABC 200 may include other elements not shown in FIG. 2 such as memory, additional/alternative processors, or other elements. For example, the ABC 200 may include control logic coupled with the networking interface 205, conversion logic 210, and/or I/O bus interface(s) 215. The control logic may be configured to facilitate the performance of one or more actions of the networking interface 205, conversion logic 210, and/or I/O bus interface(s) 215 as described herein. In some embodiments, even though only two I/O bus interfaces 215 are shown, the ABC 200 may include an additional number of bus interfaces 215. Additionally, the ABC 200 may be coupled with an additional number of BMCs 220, for example, 4 BMCs, 8 BMCs, or some other numbers of BMCs.

Figure 3:
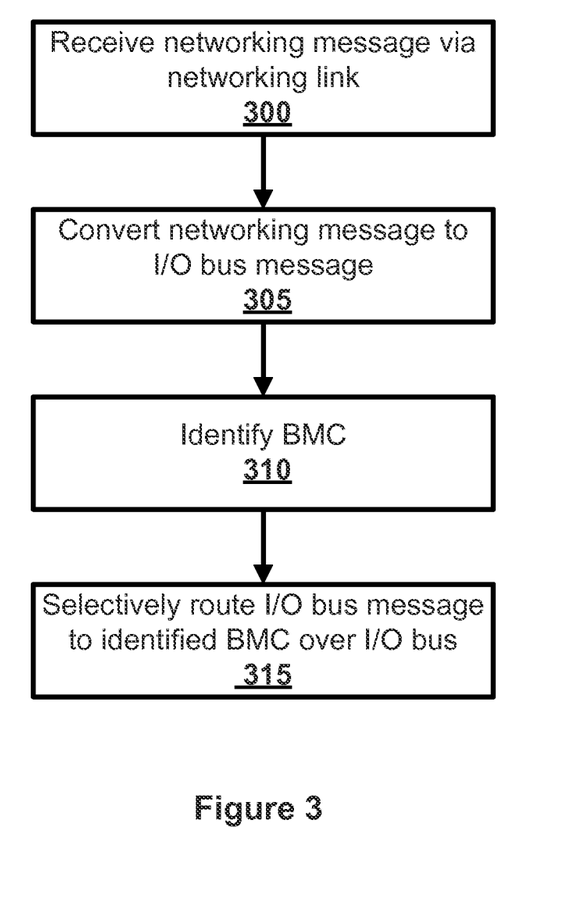
FIG. 3 illustrates a method employed by an ABC to route network traffic to a BMC, in accordance with various embodiments.

FIG. 3 depicts an example of a process that may be performed by the ABC 200 to exchange a message such as an Ethernet packet between a hybrid switch 100 and a BMC 220. Initially, the ABC 200, and specifically the networking interface 205 of the ABC 200, may receive a networking message at 300. The ABC 200 may receive the networking message from, for example, a networking port of a hybrid switch such as networking port 145 of hybrid switch 100 over a networking link such as networking link 115. The networking message may be, for example, an Ethernet message including one or more Ethernet packets. The ABC 200, and specifically the conversion logic 210 of the ABC 200, may then convert the networking message to an I/O bus message at 305.

The ABC 200, and specifically the conversion logic 210 of the ABC 200, may then identify a BMC such as BMC 220 that the I/O bus message is intended for at 310. In embodiments, the conversion logic 210 may identify the BMC based on a header or other data or elements of the I/O bus message. In other embodiments, the conversion logic 210 may identify the BMC based on a header or other data or elements of the networking message. In these embodiments, the identification of the BMC at 310 may occur either before or after the conversion of the networking message at 305. In other embodiments, the identification of the BMC may occur based on some other data element or parameter. After converting the networking message to an I/O bus message at 305 and identifying the BMC to which that message should be routed at 310, the ABC 200, and specifically the I/O bus interface 215 of the ABC 200, may then selectively route the I/O bus message to the identified BMC 220 over the appropriate I/O bus 225 at 315.

Figure 6:
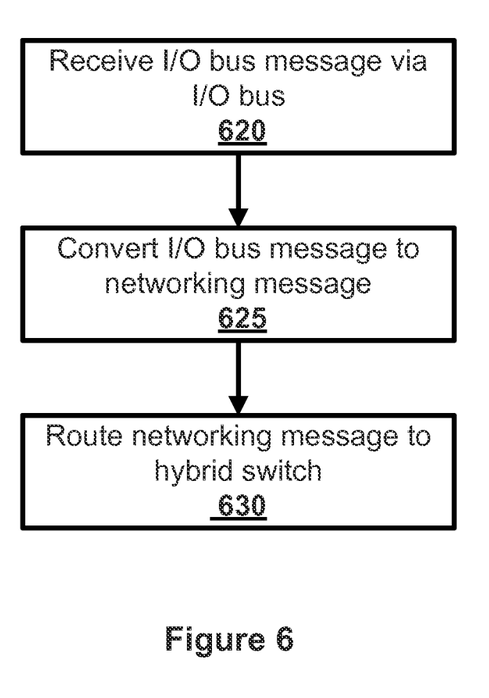
FIG. 6 illustrates a method employed by an ABC to route network traffic received from a BMC, in accordance with various embodiments.

FIG. 6 depicts an alternative process that may be performed by the ABC 200 to exchange a message between a hybrid switch 100 and a BMC 220. Initially, the ABC 200, and specifically the I/O bus interface 215, may receive an I/O bus message via an I/O bus such as I/O bus 225 from a BMC such as BMC 220 at 620. The ABC 200, and specifically the conversion logic 210, may then convert the I/O bus message to a networking message at 625. For example, the conversion logic 210 may convert the I/O bus message to an Ethernet message at 625. The ABC 200, and specifically the networking interface 205, may then route the networking message to a hybrid switch 100 at 630. For example, the networking interface 205 may route the networking message to the hybrid switch over a networking link 115 which may be, for example, an Ethernet link.

Figure 4:
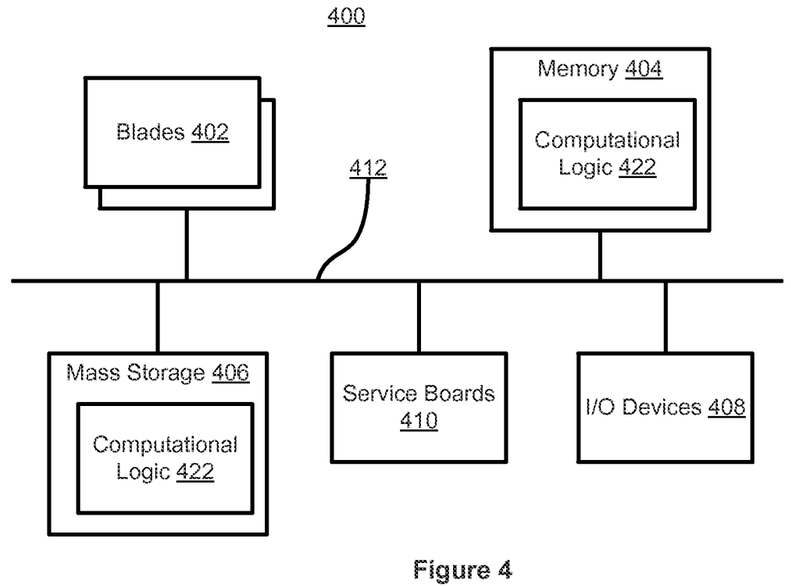
FIG. 4 illustrates an example computer system suitable for use to practice various aspects of the present disclosure, according to the disclosed embodiments.

FIG. 4 illustrates an example electronic device (e.g., computer system 400) that may be suitable for use as a rack server to practice selected aspects of the present disclosure. As shown, computer system 400 may include blade servers 402, each having one or more processors or processor cores, and shared system memory 404. For the purpose of this application, including the claims, the terms "processor" and "processor cores" may be considered synonymous, unless the context clearly requires otherwise. Additionally, computer system 400 may include shared mass storage devices 406 (such as diskette, hard drive, compact disc read-only memory (CD-ROM) and so forth), input/output (I/O) devices 408 (such as display, keyboard, cursor control and so forth) and service boards 410 having communication interfaces (such as network interface cards, modems and so forth), and earlier described ABC 200. The elements may be coupled to each other via system bus 412, which may represent one or more buses. In the case of multiple buses, they may be bridged by one or more bus bridges (not shown).

Each of these elements may perform its conventional functions known in the art. In particular, shared system memory 404 and shared mass storage devices 406 may be employed to store a working copy and a permanent copy of the programming instructions implementing various virtual machine monitors, operating systems, and/or applications, collectively referred to as computational logic 422. The various elements may be implemented by assembler instructions supported by processor(s) of blade servers 402 or high-level languages, such as, for example, C, that can be compiled into such instructions. The number, capability and/or capacity of these elements 410-412 may vary, depending on whether the server is a single stand-alone server or a configured rack of servers or a configured rack of server elements.

Figure 5:
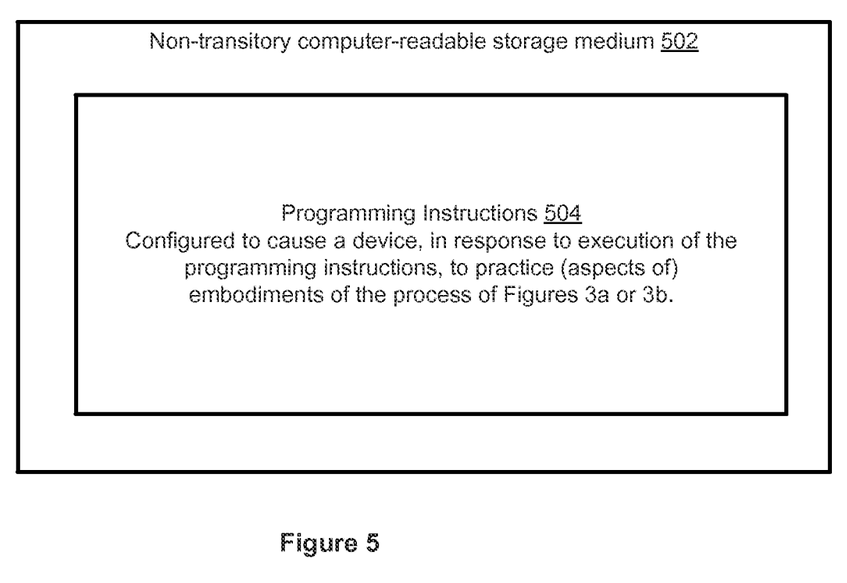
FIG. 5 illustrates a storage medium having instructions for practicing processes described with references to FIG. 3 or 6, according to disclosed embodiments.

As will be appreciated by one skilled in the art, the present disclosure may be embodied as methods or computer program products. Accordingly, the present disclosure, in addition to being embodied in hardware as earlier described, may take the form of an entire software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 5 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 502 may include a number of programming instructions 504. Programming instructions 504 may be configured to enable a device, e.g., ABC 200, in response to execution of the programming instructions, to perform, e.g., various operations associated with the processes of FIG. 3 or 6. In alternate embodiments, programming instructions 504 may be disposed on multiple computer-readable non-transitory storage media 502 instead. In alternate embodiments, programming instructions 504 may be disposed on computer-readable transitory storage media 502, such as signals.

Any combination of one or more computer-usable or computer-readable medium(s) may be utilized. The computer-usable or computer-readable medium may be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a RAM, a ROM, an EPROM or flash memory, an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency (RF), etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof Embodiments may be implemented as a computer process, a computing system or as an article of manufacture such as a computer program product of computer-readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements that are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 5, for one embodiment, a processor may be packaged together with memory having programming instructions 504 (in lieu of storing on memory and/or storage coupled to the processor). For one embodiment, the processor may be packaged together with memory having programming instructions 504 to form a System in Package (SiP). For one embodiment, the processor may be integrated on the same die with memory having programming instructions 504. For one embodiment, the processor may be packaged together with memory having programming instruction 504s to form a System on Chip (SoC). For at least one embodiment, the SoC may be utilized in, e.g., but not limited to, earlier described ABC 200.

Thus various example embodiments of the present disclosure have been described including, but not limited to:

Example 1 may include a rack system comprising: a hybrid switch that includes a plurality of networking ports and a plurality of peripheral component interconnect express (PCIe) end points (PEPs); a plurality of baseboard management controllers (BMCs) in respective blades of the rack scale server; and an aggregate BMC controller (ABC) communicatively coupled with the hybrid switch, via one of the plurality of networking ports of the hybrid switch, and with the plurality of BMCs, via a plurality of input/output (I/O) buses, to facilitate message exchanges between the hybrid switch and the BMCs.

Example 2 may include the rack system of example 1, wherein an I/O bus in the plurality of I/O buses is an I/O bus that includes fewer than 8 pins.

Example 3 may include the rack system of example 2, wherein the I/O bus is a Low Pin Count (LPC) bus, and the ABC is configured to transmit or receive data over the LPC bus using an LPC protocol.

Example 4 may include the rack system of example 2, wherein the input/output bus is a system management bus (SMBus) or an inter-integrated circuit (I2C) bus.

Example 5 may include the rack system of any of examples 1-4, wherein the one of the plurality networking ports is an Ethernet port, and the ABC is configured to transmit or receive data over an Ethernet communication link using an Ethernet protocol.

Example 6 may include the rack system of any of examples 1-4, wherein a BMC of the plurality of BMCs is to monitor a physical process of a respective blade of the rack system.

Example 7 may include the rack system of any of examples 1-4, wherein the data is an Ethernet packet.

Example 8 may include the rack system of any of examples 1-4, wherein the respective blades are respective blade servers of the rack system.

Example 9 may include the rack system of any of examples 1-4, wherein the ABC is a control plane processor (CPP).

Example 10 may include an aggregate baseboard management controller (BMC) controller (ABC) comprising: a networking interface to couple the apparatus with a hybrid switch, via a networking port of the hybrid switch; a plurality of input/output (I/O) bus interfaces to couple the apparatus with a plurality of BMCs, via a plurality of I/O buses; and conversion logic to convert messages exchanged between the hybrid switch and the BMCs.

Example 11 may include the ABC of example 10, wherein the I/O bus interfaces are I/O bus interfaces configured to couple with respective I/O buses that include fewer than 8 pins.

Example 12 may include the ABC of example 10, wherein respective I/O bus interfaces are to couple with respective Low Pin Count (LPC) buses, system management buses (SMBuses) or inter-integrated circuit (I2C) buses.

Example 13 may include the ABC of any of examples 10-12, wherein the networking interface is an Ethernet interface.

Example 14 may include the ABC of any of examples 10-12, wherein the messages include an Ethernet packet.

Example 15 may include the ABC of any of examples 10-12, wherein the apparatus is a control plane processor (CPP).

Example 16 may include a method comprising: receiving, by an aggregate baseboard management controller (BMC) controller (ABC), first networking messages from a hybrid switch via a networking link coupling the hybrid switch and the ABC; converting the first networking messages, by the ABC, to first input/output (I/O) bus messages; selectively routing, by the ABC to a plurality of BMCs, the first I/O bus messages via a plurality of I/O buses coupling the ABC and the BMCs; receiving second I/O bus messages, by the ABC, from the BMCs, via the I/O buses; converting the second I/O bus messages, by the ABC, to second networking messages; and selectively routing the second networking messages to the hybrid switch.

Example 17 may include the method of example 16, wherein selectively routing the first I/O bus messages via an I/O bus comprises selectively routing the first I/O bus messages via a Low Pin Count (LPC) bus that includes fewer than 8 pins.

Example 18 may include the method of example 16, wherein receiving the second I/O bus messages via the I/O buses comprises receiving the second I/O bus messages via a Low Pin Count (LPC) bus that includes fewer than 8 pins.

Example 19 may include the method of any of examples 16-18, wherein receiving the first networking messages via the networking link coupling the hybrid switch and the ABC comprises receiving the first networking messages via an Ethernet link coupling an Ethernet port of the hybrid switch with the ABC.

Example 20 may include the method of any of any of examples 16-18, wherein receiving, by the ABC, the first networking messages comprises receiving, by a control plane processor (CPP), the first networking messages.

Example 21 may include one or more non-transitory computer-readable media comprising instructions to cause an aggregate baseboard management controller (BMC) controller (ABC), upon execution of the instructions by the ABC, to: receive first networking messages from a hybrid switch via a networking link coupling the hybrid switch and the ABC; convert the first networking messages to first input/output (I/O) bus messages; selectively route the first I/O bus messages to a plurality of BMCs via a plurality of I/O buses coupling the ABC and the BMCs; receive second I/O bus messages from the BMCs via the I/O buses; convert the second I/O bus messages to second networking messages; and selectively route the second networking messages to the hybrid switch.

Example 22 may include the one or more non-transitory computer-readable media of example 21, wherein the instructions to selectively route the first I/O bus messages include instructions to selectively route the first I/O bus messages via a Low Pin Count (LPC) bus that includes 7 pins or less.

Example 23 may include the one or more non-transitory computer-readable media of example 21, wherein the instructions to receive second I/O bus messages include instructions to receive second I/O bus messages via a Low Pin Count (LPC) bus that includes 7 pins or less.

Example 24 may include the one or more non-transitory computer-readable media of any of examples 21-23, wherein the instructions to receive the first networking messages include instructions to receive the first networking messages via an Ethernet link coupling an Ethernet port of the hybrid switch with the ABC.

Example 25 may include the one or more non-transitory computer-readable media of any of examples 21-23, wherein receiving, by an aggregate baseboard management controller (BMC) controller (ABC), first networking messages comprises receiving, by a control plane processor (CPP), first networking messages.

Example 26 may include an aggregate baseboard management controller (BMC) controller (ABC) comprising: means to receive first networking messages from a hybrid switch via a networking link coupling the hybrid switch and the ABC; means to convert the first networking messages to first input/output (I/O) bus messages; means to selectively route, to a plurality of BMCs, the first I/O bus messages via a plurality of I/O buses coupling the ABC and the BMCs; means to receive second I/O bus messages from the BMCs, via the I/O buses; means to convert the second I/O bus messages to second networking messages; and means to selectively route the second networking messages to the hybrid switch.

Example 27 may include the ABC of example 26, wherein the means to selectively route the first I/O bus messages via an I/O bus comprise means to selectively route the first I/O bus messages via a Low Pin Count (LPC) bus that includes fewer than 8 pins.

Example 28 may include the ABC of example 26, wherein the means to receive the second I/O bus messages via the I/O buses comprise means to receive the second I/O bus messages via a Low Pin Count (LPC) bus that includes fewer than 8 pins.

Example 29 may include the ABC of any of examples 26-28, wherein the means to receive the first networking messages via the networking link coupling the hybrid switch and the ABC comprise means to receive the first networking messages via an Ethernet link coupling an Ethernet port of the hybrid switch with the ABC.

Example 30 may include the ABC of any of any of examples 26-28, wherein the means to receive the first networking messages comprises means to receive, by a control plane processor (CPP), the first networking messages.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A rack system comprising:
    a hybrid switch that includes a plurality of networking ports and a plurality of peripheral component interconnect express (PCIe) end points (PEPs);
    a plurality of baseboard management controllers (BMCs) in respective blades of a rack scale server; and
    an aggregate BMC controller (ABC) communicatively coupled with the hybrid switch, via one of the plurality of networking ports of the hybrid switch, and with the plurality of BMCs, via a plurality of input/output (I/O) buses, to facilitate message exchanges between the hybrid switch and the BMCs;
    wherein the one of the plurality of networking ports is an Ethernet port, and the ABC is configured to transmit or receive data with the hybrid switch over an Ethernet communication link using an Ethernet protocol.

2. The rack system of claim 1, wherein an I/O bus in the plurality of I/O buses is an I/O bus that includes fewer than 8 pins.

3. The rack system of claim 2, wherein the I/O bus is a Low Pin Count (LPC) bus, and the ABC is configured to transmit or receive data over the LPC bus using an LPC protocol.

4. The rack system of claim 2, wherein the input/output bus is a system management bus (SMBus) or an inter-integrated circuit (I2C) bus.

5. The rack system of claim 1, wherein a BMC of the plurality of BMCs is to monitor a physical process of a respective blade of the rack system.

6. The rack system of claim 1, wherein the data is an Ethernet packet.

7. The rack system of claim 1, wherein the respective blades are respective blade servers of the rack system.

8. The rack system of claim 1, wherein the ABC is a control plane processor (CPP).

9. An aggregate baseboard management controller (BMC) controller (ABC) comprising:
- an Ethernet networking interface to couple the ABC with a hybrid switch, via an Ethernet networking port of the hybrid switch;
- a plurality of input/output (I/O) bus interfaces to couple the ABC with a plurality of BMCs, via a plurality of I/O buses; and
- conversion logic to convert messages exchanged between the hybrid switch and the BMCs.

10. The ABC of claim 9, wherein the I/O bus interfaces are I/O bus interfaces configured to couple with respective I/O buses that include fewer than 8 pins.

11. The ABC of claim 9, wherein respective I/O bus interfaces are to couple with respective Low Pin Count (LPC) buses, system management buses (SMBuses) or inter-integrated circuit (I2C) buses.

12. The ABC of claim 9, wherein the messages include an Ethernet packet.

13. The ABC of claim 9, wherein the apparatus is a control plane processor (CPP).

14. A method comprising:
- receiving, by an aggregate baseboard management controller (BMC) controller (ABC), first networking messages from a hybrid switch via an Ethernet networking link coupling an Ethernet port of the hybrid switch and the ABC;
- converting the first networking messages, by the ABC, to first input/output (I/O) bus messages;
- selectively routing, by the ABC to a plurality of BMCs, the first I/O bus messages via a plurality of I/O buses coupling the ABC and the BMCs;
- receiving second I/O bus messages, by the ABC, from the BMCs, via the I/O buses;
- converting the second I/O bus messages, by the ABC, to second networking messages; and
- selectively routing the second networking messages to the hybrid switch via the Ethernet networking link.

15. The method of claim 14, wherein selectively routing the first I/O bus messages via an I/O bus comprises selectively routing the first I/O bus messages via a Low Pin Count (LPC) bus that includes fewer than 8 pins.

16. The method of claim 14, wherein receiving the second I/O bus messages via the I/O buses comprises receiving the second I/O bus messages via a Low Pin Count (LPC) bus that includes fewer than 8 pins.

17. The method of claim 14, wherein receiving, by the ABC, the first networking messages comprises receiving, by a control plane processor (CPP), the first networking messages.

18. Non-transitory computer-readable media comprising instructions to cause an aggregate baseboard management controller (BMC) controller (ABC), upon execution of the instructions by the ABC, to:
- receive first networking messages from a hybrid switch via an Ethernet networking link coupling an Ethernet port of the hybrid switch and the ABC;
- convert the first networking messages to first input/output (I/O) bus messages;
- selectively route the first I/O bus messages to a plurality of BMCs via a plurality of I/O buses coupling the ABC and the BMCs;
- receive second I/O bus messages from the BMCs via the I/O buses;
- convert the second I/O bus messages to second networking messages; and
- selectively route the second networking messages to the hybrid switch via the Ethernet networking list.

19. The non-transitory computer-readable media of claim 18, wherein the instructions to selectively route the first I/O bus messages include instructions to selectively route the first I/O bus messages via a Low Pin Count (LPC) bus that includes 7 pins or fewer.

20. The non-transitory computer-readable media of claim 18, wherein the instructions to receive second I/O bus messages include instructions to receive second I/O bus messages via a Low Pin Count (LPC) bus that includes 7 pins or fewer.

21. The non-transitory computer-readable media of claim 18, wherein receiving, by an aggregate baseboard management controller (BMC) controller (ABC), first networking messages comprises receiving, by a control plane processor (CPP), first networking messages.

* * * * *